United States Patent [19]

Uehara et al.

[11] Patent Number: 5,452,380
[45] Date of Patent: Sep. 19, 1995

[54] METHOD AND SYSTEM FOR IMAGING A TEXT

[75] Inventors: Tetsuzou Uehara, Tokyo; Kenji Shimoi, Tokorozawa, both of Japan

[73] Assignee: Hitachi, Ltd., Tokyo, Japan

[21] Appl. No.: 3,596

[22] Filed: Jan. 13, 1993

[30] Foreign Application Priority Data

Jan. 14, 1992 [JP] Japan .................. 4-004891

[51] Int. Cl.$^6$ .......................... G06K 9/00; G06F 15/00
[52] U.S. Cl. ...................... 382/317; 345/128; 345/143; 395/146; 395/148; 382/298
[58] Field of Search .................. 382/44, 61, 47; 345/128–130, 143; 395/110, 148, 151, 146

[56] References Cited

U.S. PATENT DOCUMENTS

| | | | |
|---|---|---|---|
| 4,539,653 | 9/1985 | Bartlett et al. | 395/148 |
| 4,755,955 | 7/1988 | Kimura et al. | 395/148 |
| 5,001,654 | 3/1991 | Winiger et al. | 395/148 |
| 5,179,650 | 1/1993 | Fukui et al. | 395/148 |
| 5,263,132 | 11/1993 | Parker et al. | 395/146 |

OTHER PUBLICATIONS

B. J. Woods, Editor "Information Processing . . . Part 6: Character Content Architectures", ISO 8613-6, Jan. 1988. pp. 12–15.

Adobe Systems, Inc. "Postscript Language Reference Manual" Second Edition. 190. p. 520.

*Primary Examiner*—Leo H. Boudreau
*Attorney, Agent, or Firm*—Antonelli, Terry, Stout & Kraus

[57] ABSTRACT

In a method and system for imaging a text by using a different font than that designated when formatting or by changing a character size, a row area width a character sequence width and a total blank width at imaging are calculated based on row area information for arranging rows of the text, character sequence information of words of each row, character size information for layouting and character size information for imaging, the total blank width is substantially evenly divided to calculate a word interval. A starting word is positioned at a right edge of the row area and other words are positioned with the word interval to determine the character sequence position for imaging, and the rows are outputted. Thus, the word interval is properly adjusted, no words are split and natural imaging is attained.

15 Claims, 9 Drawing Sheets

METHOD AND SYSTEM FOR IMAGING A TEXT

BACKGROUND OF THE INVENTION

The present invention relates to a method and system for imaging a text, and more particularly to method and system for imaging a text by using different fonts than that designated in the text formatting, or imaging the text with different character size.

FIG. 10 shows in a simplified form a row of a text in accordance with a basic specification of the ODA (Office/Open Document Architecture) Standard established by the ISO (International Standard Organization) in 1988.

Numeral 211 denotes a name of font used in the formatting, numeral 212 denotes a character size used in the formatting, and numeral 213 denotes a row position P(X, Y) which is a left top corner position coordinate of a row area, a head position PW(X, Y) in the row at which a head of a character sequence is to be positioned, and the character sequence S.

FIG. 11 shows an imaged output of the row shown in FIG. 10.

FIG. 12 shows in a simplified form a row of a text in accordance with a basic specification of Post Script of Adobe Systems Inc. which is a kind of PDL (Page Description Language).

Numeral 311 denotes a name of font used in the formatting, numeral 312 denotes a character size used in the format, and numeral 313 denote head positions PW1(X, Y), PW2(X, Y), ... PWL(X,Y) of words in the row, and character sequences S1, S2, ... SL.

FIG. 13 shows an imaged output of the row shown in FIG. 12. It should be noted that the character sequences S3 and S4 are partial character sequences of one word in the ordinary meaning of the term. It does not contradict the specification of the Post Script although that may happen depending on a format condition. They appear as one word so long as the text is imaged by using the font designated in the formatting without changing the character size.

The post script is described in "Post Script Reference Manual SECOND EDITION" Adobe Systems Incorporated, 1990, Addison-Wesley Publishing Company, Inc.

In the prior art, the document in the formatting can be reproduced exactly regardless of an apparatus or a system so long as the font designated in the formatting is used without changing the character size.

However, where a different font from that intended in the formatting is used or the character size is changed in imaging the text, unnatural imaging may take place depending on a condition.

FIG. 14 shows imaging done in accordance with the ODA specification shown in FIGS. 10 and 11. When a font having a narrower lateral length than that intended in the formatting is used, the character sequence is offset to the left and an unnatural space appears on the righthand side of the row area.

FIG. 15 shows imaging performed in accordance with the Post Script specification shown in FIGS. 12 and 13. When a font having a narrower lateral length than that of the font intended in the formatting is used, a string "SEQUENCE" is split into two parts.

A heading word of a starting row of a paragraph, of starting words of rows of a text are arranged to retract to the right from a left edge of the row area. On the other hand, the starting words of other rows are arranged to align with the left edge of the row area.

Ending words of rows other than that of an end row of the paragraph are arranged to align with a right edge of the row area. On the other hand, the ending word of the end row of the paragraph is not aligned to the right edge of the row area but it is permitted to leave a space on the righthand side.

The foregoing enables a reader to visually recognize the paragraph as a unit to more easily facilitate reading.

However, where a font different than that of the font intended in the formatting is used or character size is changed to image the text, the positioning pattern of words of the paragraph changes and the imaged form is hard to read. For example, as shown in FIG. 16, the starting word of the start line of the paragraph may be arranged at the left edge of the row area or the word space of the end row of the paragraph may be unduly narrowed.

SUMMARY OF THE INVENTION

It is an object of the present invention to provide a method and system for imaging a text which offer natural imaging even if the text is imaged using a different font than that designated in the formatting or by changing the character size.

It is another object of the present invention to provide method and system for imaging a text which do not cause a change in a positioning pattern of words of a paragraph even if the text is imaged by using a different font than that designated in the formatting or by changing the character size.

In accordance with a first aspect of the method and system for imaging a text of the present invention, text data including at least row area information for positioning rows of the text, character sequence information of words of respective rows, and character size information for the formatting, and imaging condition data including at least character size information for the imaging are designated, a row area width, a character sequence width and a total blank width for the imaging are calculated based on the row area information, the character sequence information and the character size information for the formatting, the total blank width is evenly divided to calculate a word interval, a starting word is arranged at the left edge of the row area and other words are arranged with the word interval to determine the character sequence position for the imaging, and they are output in accordance with the determined character sequence position for the imaging.

In accordance with a second aspect of the method and system of the present invention, the text data includes paragraph starting row information and paragraph ending row information, a blank is reserved on the left of a starting word in the paragraph starting row, and the word interval in the paragraph ending row is made close to an average word interval of the paragraph.

In the first aspect, the row area information of each row, the character sequence information of words of each row and the character size information are stored as the text data for the formatting. At the imaging, when the character size information for the imaging is designated as the imaging condition data, the row area width and the character sequence width for the imaging are calculated based on the row area information, the character sequence information, the character size information for the layouting and the character size information for the imaging. A total blank width is also calculated from a difference therebetween. The total blank width is evenly divided to calculate the word interval. The words are arranged in accordance with the word interval.

Thus, even if the text is imaged by using a different font than that designated in the formatting or by changing the character size, the word interval is properly adjusted. No split of a word occurs and natural imaging is attained.

In the second aspect, the paragraph starting row information and the paragraph ending row information are stored as the text data in the formatting. At the imaging, the blank area is reserved on the left of the starting word in the paragraph starting row, and in the paragraph ending row, the word interval is made close to the average word interval of the paragraph.

Thus, even if the text is imaged by using a different font than that designated at the formatting or by changing the character size, the starting row of the paragraph appears as a starting row, and a balanced word interval is attained in the ending row.

DESCRIPTION OF THE PREFERRED EMBODIMENTS

The preferred embodiments of the present invention are now explained with reference to the drawings, although the present invention is not limited thereto.

Figure 1:
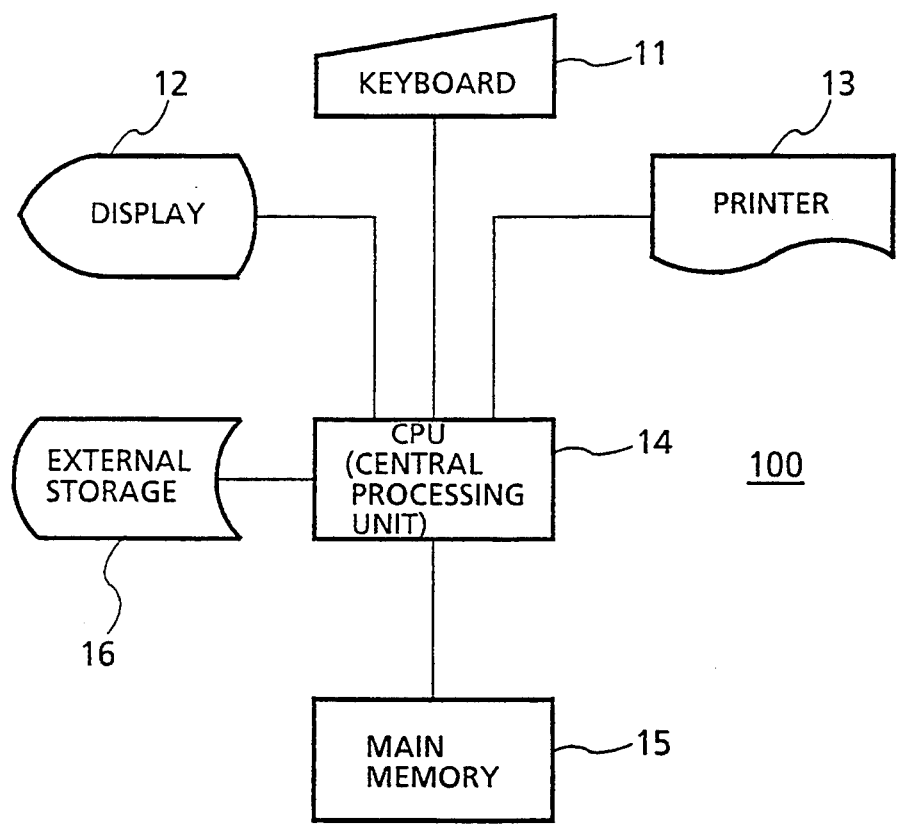
FIG. 1 shows a configuration of a system for imaging a text for implementing a method for imaging the text of the present invention.

FIG. 1 shows a configuration of a system 100 for imaging a text for implementing a method for imaging the text of the present invention.

Numeral 11 denotes a keyboard which is an input device, numeral 12 denotes a display device which is an output device, numeral 13 denotes a printer which is another output device, numeral 14 denotes a processing unit for executing the text imaging process, numeral 15 denotes a main memory, and numeral 16 denotes an external memory for storing a text imaging program, a character text data and a font dictionary.

Figure 2:
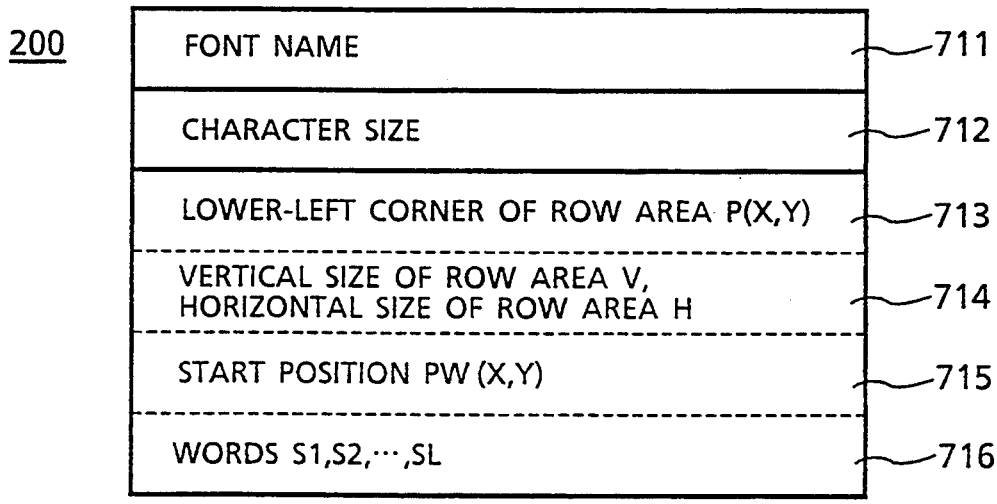
FIG. 2 shows text data.

FIG. 2 shows a format of text data 200.

Numeral 711 denotes a name of font, numeral 712 denotes a character size, numeral 713 denotes a row area left bottom position P(X, Y) which is a left bottom coordinate of the row area in a page, numeral 714 denotes a row area height V and a row area width H, numeral 715 denotes a start positioning position PW(X, Y) which is a positioning point of a starting character in the row area, and numeral 716 denotes a character sequence of words S1, S2, . . . SL arranged in the row area.

The font may be designated for each character although a font is designated for each row in the present embodiment.

Figure 3:
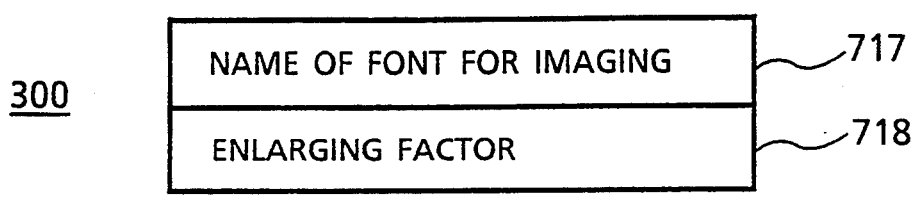
FIG. 3 shows imaging condition data.

FIG. 3 shows a format of imaging condition data 300 designated by a user through the keyboard 11.

Numeral 717 denotes a font for the imaging, and numeral 718 denotes an enlargement factor E at the imaging. The enlargement factor E may be smaller than unity.

Again, it is assumed that a font is designated for each row.

When the user designates the text data 200 to be imaged and the imaging condition data 300 through the keyboard 11, the processing unit 14 reads the text imaging program, the designated text data 200 and the font dictionary relating to the designated imaging condition data 300 from the external storage 16 into the main memory 15. Then, the text imaging process is executed.

Figure 4:
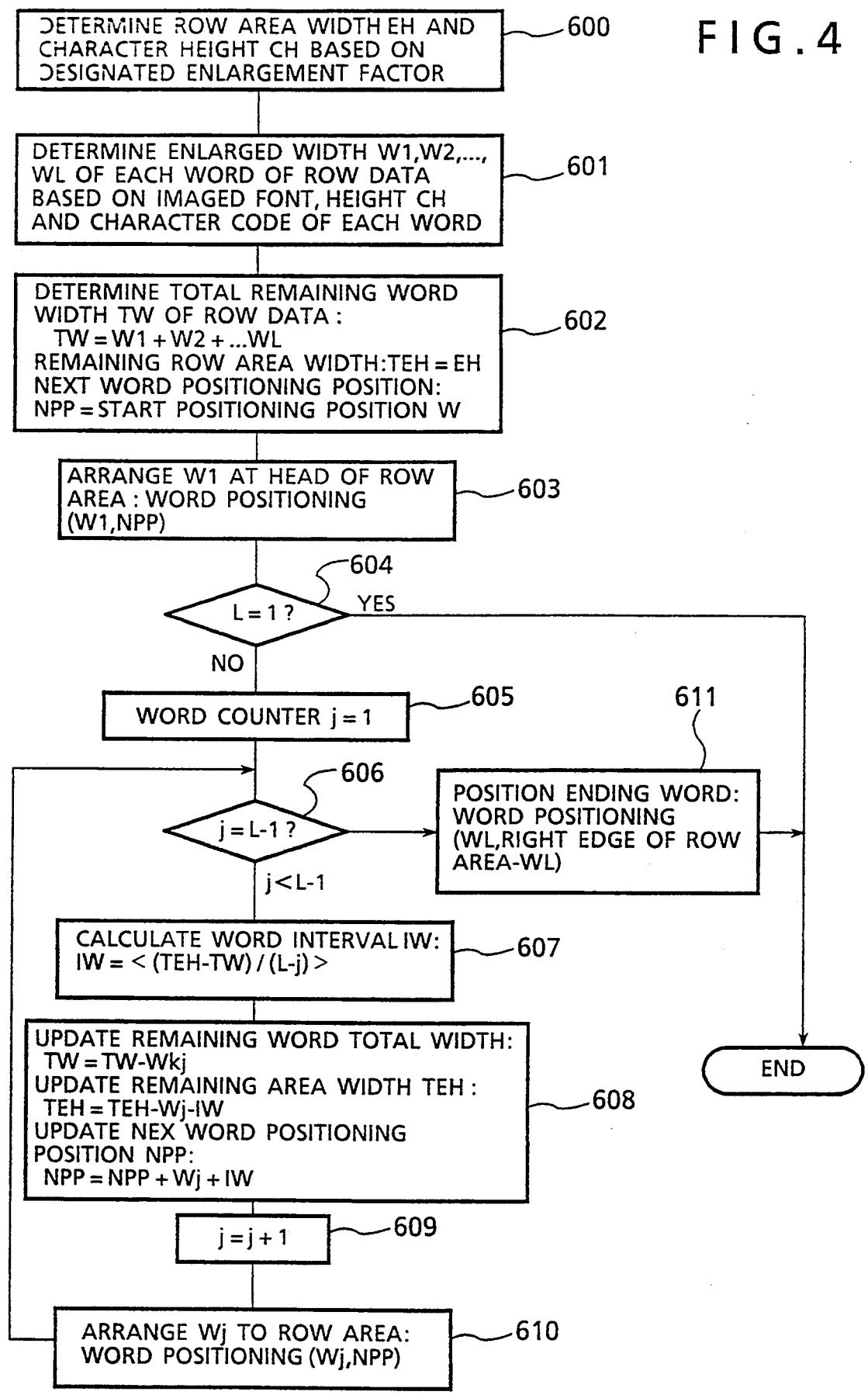
FIG. 4 shows a flow chart of one embodiment of the method for imaging the text of the present invention.

FIG. 4 shows a flow chart of a main portion of the text imaging process. It is a process for one row. For a plurality of rows, the same process may be repeated.

In step 600, a row area width EH, a character height CH and a starting point for the imaging are determined based on the designated character text and enlargement factor E.

In step 601, widths W1, W2, . . . WL of words S1, S2, . . . SL for the imaging are determined based on the font for the imaging, the character height CH and the character sequence of words S1, S2, . . . SL.

In step 602, total remaining word width TW which is a total width of remaining words to be determined for positioning is determined. Since the positioning of all words is now pending, $$TW = W1 + W2 + \ldots WL$$

A remaining row area width TEH which is a width of the row area in which a word or words remain unpositioned is determined. Since all words are now unpositioned and the entire row area remains, $$TEH = EH$$

A next word positioning position NPP which is a start point of a word to be positioned next in the row area is determined. Since the word to be positioned next positioned is the starting word S1, the next word positioning position NPP is equal to the starting positioning position W.

In step 603, a word positioning routine having "width of word to be positioned" and "starting position" as arguments is read to position the starting word S1. The width of the starting word S1 is W1 and the starting position is the next word positioning position NPP. Thus, the word positioning routine may be read by > word positioning (W1, NPP)

In step 604, whether the number of words L of the row data is "1" or not is determined. If L=1 (the row data includes one word), the process proceeds to step 612 to terminate the process. If L>1 (the row data includes two or more words), the process proceeds to step 605.

In step 605, a word counter j is initialized to "1".

In step 606, whether a condition of j=L−1 (the number of remaining words is "1") is met or not is determined. If the condition of j=L−1 is met, the process proceeds to step 611. If the condition of j=L−1 is not met (the number of remaining words is larger than "1"), the process proceeds to step 607.

In step 607, an interval IW between the immediately previously positioned word and the word to be positioned next is calculated by a formula $$IW = <(TEH-TW)/(L-j)>$$

where $<m>$ represents a maximum integer not exceeding a non-negative numeral m, and a minimum unit of a resolution power of the display 12 or the printer 13 is "1". The formula indicates that the blank of the remaining row area is evenly allocated to the remaining words.

In step 608, the width Wj of the word to be positioned next is subtracted from the total remaining word width TW to update the total remaining word width TW. Namely, $$TW = TW - Wj$$

The interval IW before the word to be positioned next and the width Wj of the next word to be positioned are subtracted from the remaining row area width TEH to update the remaining row area width TEH. Namely, $$TEH = TEH - IW - Wj$$

The word interval IW to the word to be positioned next and the width Wj of the word to be positioned next are added to the next word positioning position NPP to update the next word positioning position NPP. Namely, $$NPP = TEH + IW + Wj$$

In step 609, the word counter j is incremented by one.

In step 610, the word positioning routine is read to position the words. The word width is now Wj and the starting position is the next word positioning position NPP. Thus, the word positioning routine is read by > word positioning (Wj, NPP).

Then, the process returns to the step 606.

In step 611, an ending word SL is positioned while the end of the word is aligned to the right edge of the row area. The width of the end word SL is WL and the starting position is "right edge of the row area—WL". Thus, the word positioning routine is read by > word positioning (WL, right edge of the row area—WL)

The end word SL is positioned while the end of the end word SL is aligned to the right edge of the row area in order to absorb an error due to the rounding process $<m>$ in the step 607 by the last interval.

Figure 5:
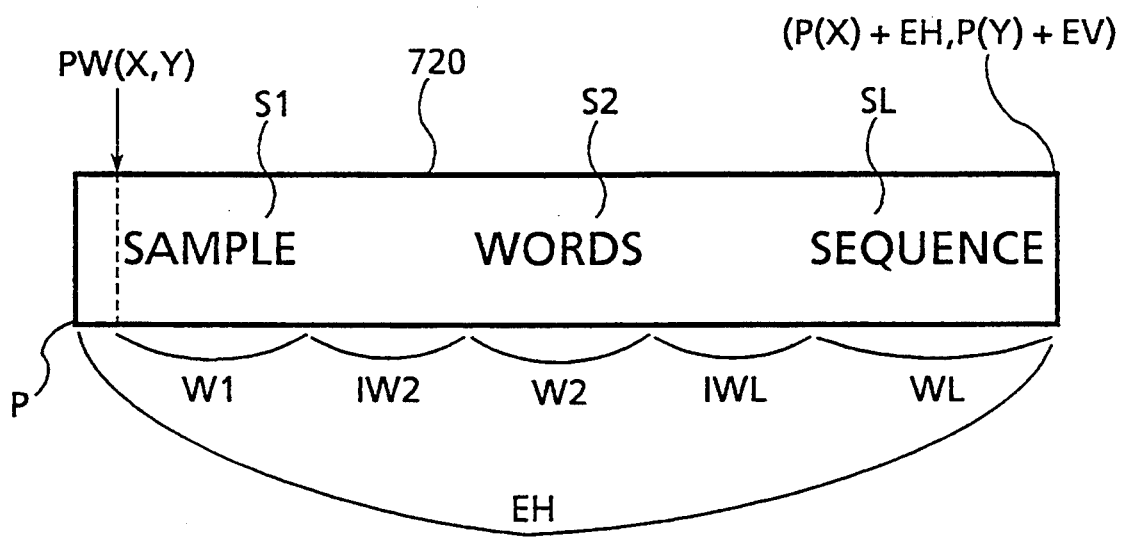
FIG. 5 shows an imaged output by the process of FIG. 4.

FIG. 5 shows an example of an imaged row.

The left bottom coordinate of the row area 720 is P(X, Y).

The starting word S1 is positioned starting from the start positioning position W.

The second word S2 is positioned with an interval IW1 which is rounded from (EH−(W1−W2+WL))/(L−1).

The end word SL is positioned with the end thereof being aligned to the right edge of the row area 720.

The right top coordinate of the row area 720 is (P(X)+EH, P(Y)+EV), where EV is an enlarged row area height.

In accordance with the above method for imaging the text, the problems of split or overlap of the characters of one word or blank at the right edge of the row area are solved.

Figure 6:
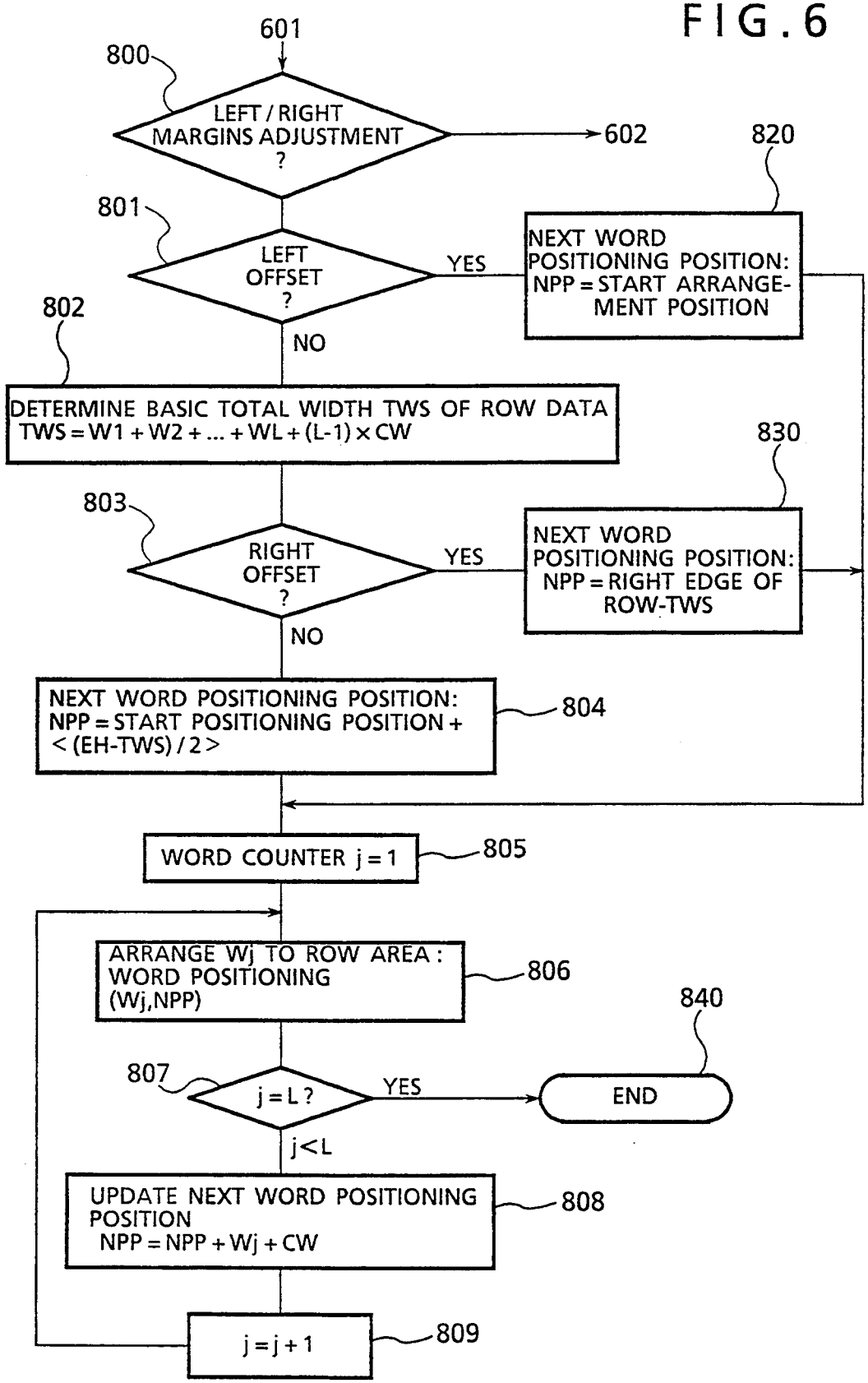
FIG. 6 shows a flow chart of another embodiment of the method for imaging the text of the present invention.

FIG. 6 shows a flow chart of a main portion of the process for imaging the text when the format is designated (left and right margins adjustment, left offset, right offset, centering). The present flow chart is inserted between the steps 601 and 602 in FIG. 4.

In step 800, whether or not the format designation is "left and right margins adjustment" is determined. (If the format designation is omitted, it is assumed that "left and right margins adjustment" has been designated). If it is the designation of "left and right margins adjustment", the process returns to step 602 of FIG. 4 because the process of FIG. 4 attains the process of left and right margins adjustment. If the format designation is not "left and right margins adjustment", the process proceeds to a step 801.

In step 801, whether or not the format designation for the row is "left offset" is determined. If it is the "left offset" designation, the process proceeds to step 820. If the layout designation is not "left offset", the process proceeds to step 802.

In step 820, the next character positioning position NPP is set to the start positioning position W. Then, the process proceeds to step 805.

In step 802, a basic total width TWS of the row data is determined. The basic total width TWS is a sum of the widths W1, W2, ... WL of the words of the row data and the word intervals. Assuming that a predetermined word interval is CW (when the format designation is "left offset", "right offset" or "centering", a fixed basic width is provided between words and no adjustment is required), $$TWS = W1 + W2 + \ldots + WL + (L-1) \times CW$$

In step 803, whether or not the layout designation for the row is "right offset" is determined. If it is "right offset", the process proceeds to step 830. If the format designation is not "right offset", the process proceeds to step 804.

In step 830, the next character positioning position NPP is set to a position which is back from the right edge of the row area by the basic total width TWS. Then, the process proceeds to step 805.

In step 804, since the format designation for the row is "centering", the next word positioning position for the "centering" is determined. Namely, it is set to a position which is ahead of the start positioning position W by one half of a difference between the row area width EH and the basic total width TWS.

In step 805, the word counter j is initialized to "1".

In step 806, the j-th word Sj is arranged to the next word positioning position NPP.

In step 807, whether or not the end word SL has been arranged is determined. If j=L, it means that the end word SL has been arranged, and the process proceeds to step 840 to terminate the process. Otherwise., the process proceeds to step 808.

In step 808, the next word positioning position NPP is updated.

In step 809, the word counter j is incremented by one.

FIGS. 7A-7D show examples of imaged rows.

Figure 7A:
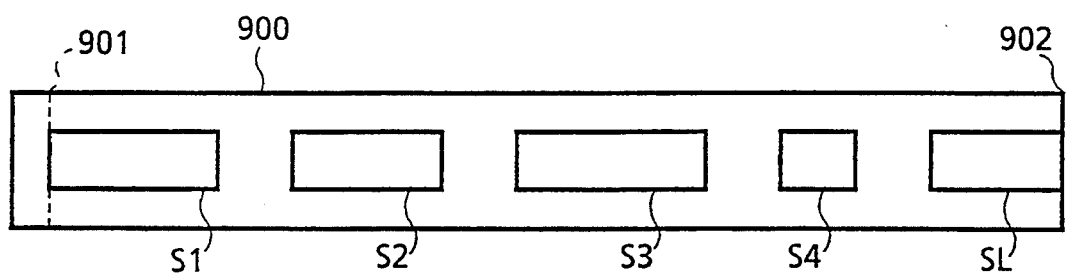
FIGS. 7A–7D show imaged row outputs by the process of FIG. 6.
Figure 7B:
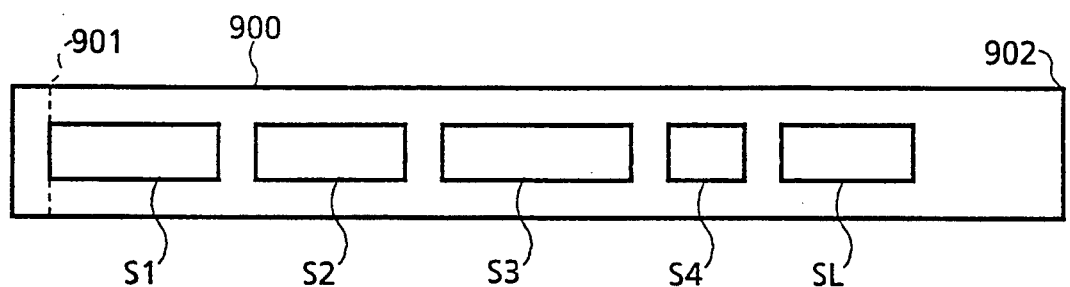
Figure 7C:
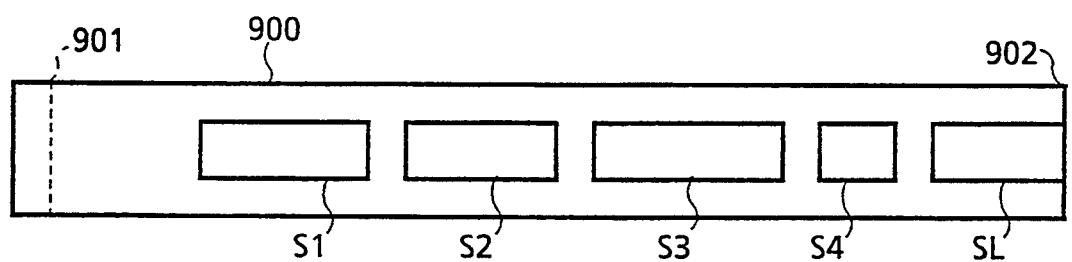
Figure 7D:
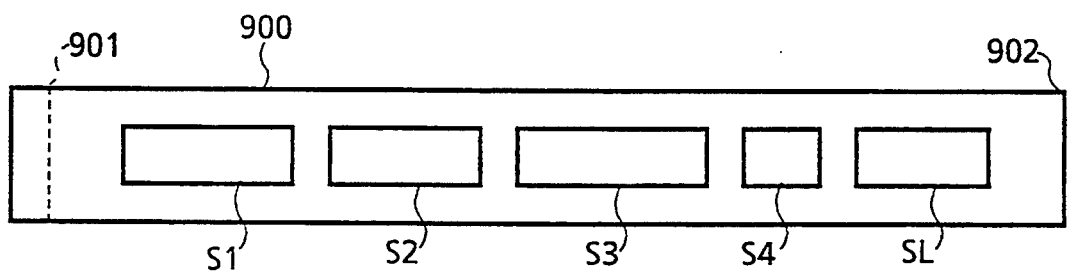

FIG. 7A shows "left and right margins adjustment. FIG. 7B shows "left offset". FIG. 7C shows "right offset". FIG. 7D shows "centering".

Numeral 900 denotes a row area, numeral 901 denotes a start positioning position, and 902 denotes the right edge of the row area.

The spaces between the words S1~SL are even divisions of the space in case of "left and right margins adjustment". It is fixed to CW in case of "left offset", "right offset" or "centering".

In the above process for imaging the text, the problems of split or overlap of characters of one word and the blank at the right edge of the row area are solved and any desired format can be designated.

Figure 8:
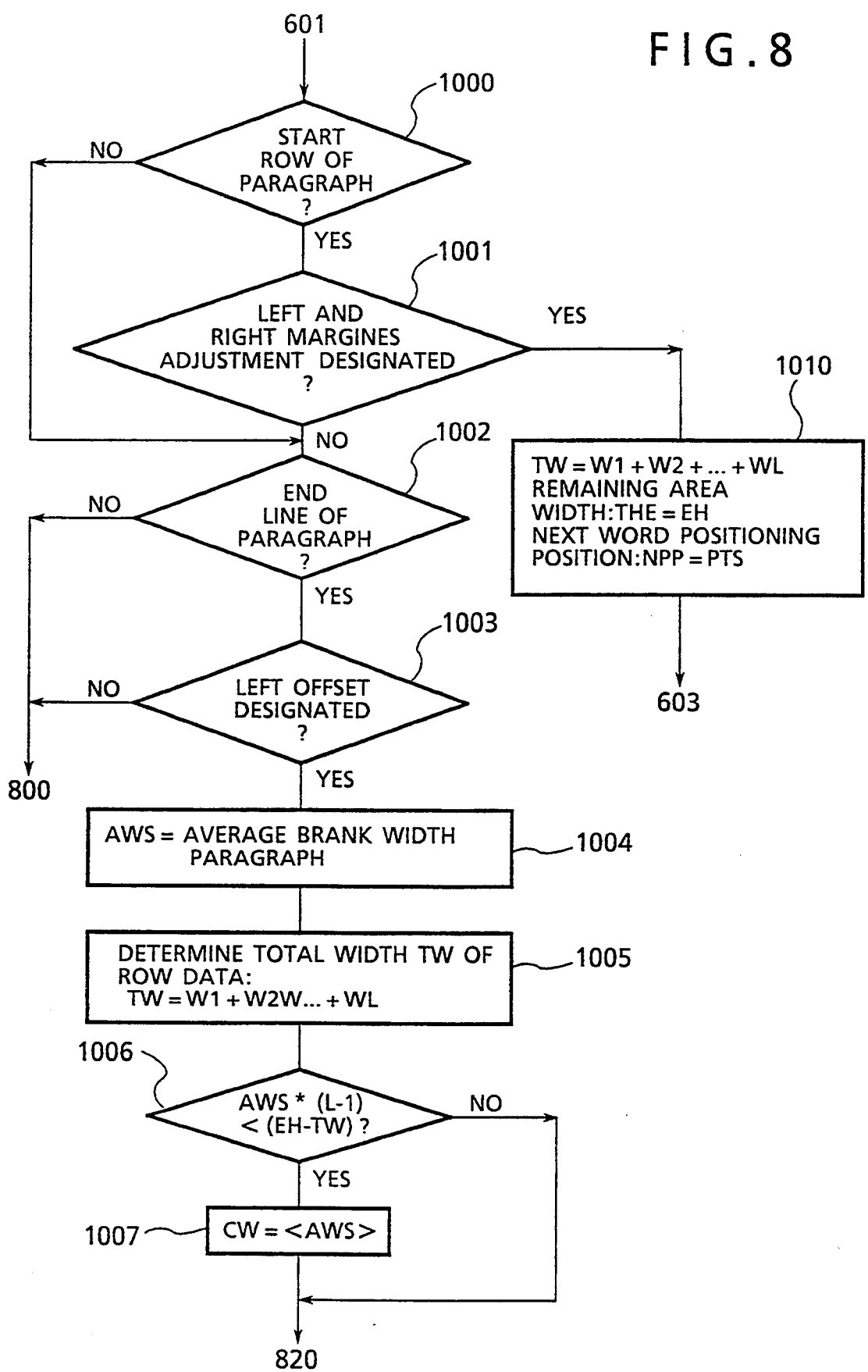
FIG. 8 shows a flow chart of a further embodiment of the method for imaging the text of the present invention.

FIG. 8 shows a flow chart of a main portion of the process for imaging the text when the "left and right margins adjustment" is changed in the paragraph starting row or the "left offset" is changed in the paragraph ending row. The present flow chart is inserted before the step 800 of FIG. 6.

In step 1000, whether or not the row is the paragraph starting row or not is determined. If it is, the process proceeds to step 1001. If it is not, the process proceeds to step 1002.

In step 1001, whether or not the layout designation for the row is "left and right margins adjustment" is determined. If it is, the process proceeds to step 1010. If it is not, the process proceeds to step 1002.

In step 1002, a total remaining word width TW which is a total width of words having pending positioning is determined. Since the positioning of all words now remains pending, $$TW = W1 + W2 + \ldots + WL$$

A remaining row area width TEH which is a width of the row area having unpositioned words is determined. Since all words are now unpositioned and the entire row area remains,

TEH=EH

The next word positioning position NPP which is the start position of the word to be positioned next in the row area is set to a predetermined start position PTS. Then, the process proceeds to step 603 of FIG. 4. As a result, the head of the starting row of the paragraph is offset to the right by a fixed width.

In step 1002, whether or not the row is the paragraph ending row is determined. If it is, the process proceeds to step 1003. If it is not, the process proceeds to step 800 of FIG. 6.

In step 1003, whether or not the layout designation for the row is "left offset" is determined. If it is, the process proceeds to step 1004. If it is not, the process proceeds to step 800 of FIG. 6.

In step 1004, an average word-to-word space width of all rows (excluding the paragraph ending row) in the paragraph is calculated to set the average word interval AWS.

In step 1005, a total width TW of the words of the row data is determined.

In step 1006, whether it is possible to set the average word interval AWS to each word interval or not is determined. If it is not possible, the process proceeds to the step 820 of FIG. 6 to conduct the same process as that for the format designation of "left offset". In this case, the word interval CW which is set to be smaller than the average word interval AWS is used as it is. If it is possible, the process proceeds to step 1007.

In step 1007, the word interval CW=<AWS> is set. Namely, the rounded result of the average word interval AWS is set as the word interval CW. Then, the process proceeds to step 820 of FIG. 6 to conduct the same process as that for the layout designation of "left offset".

Figure 9:
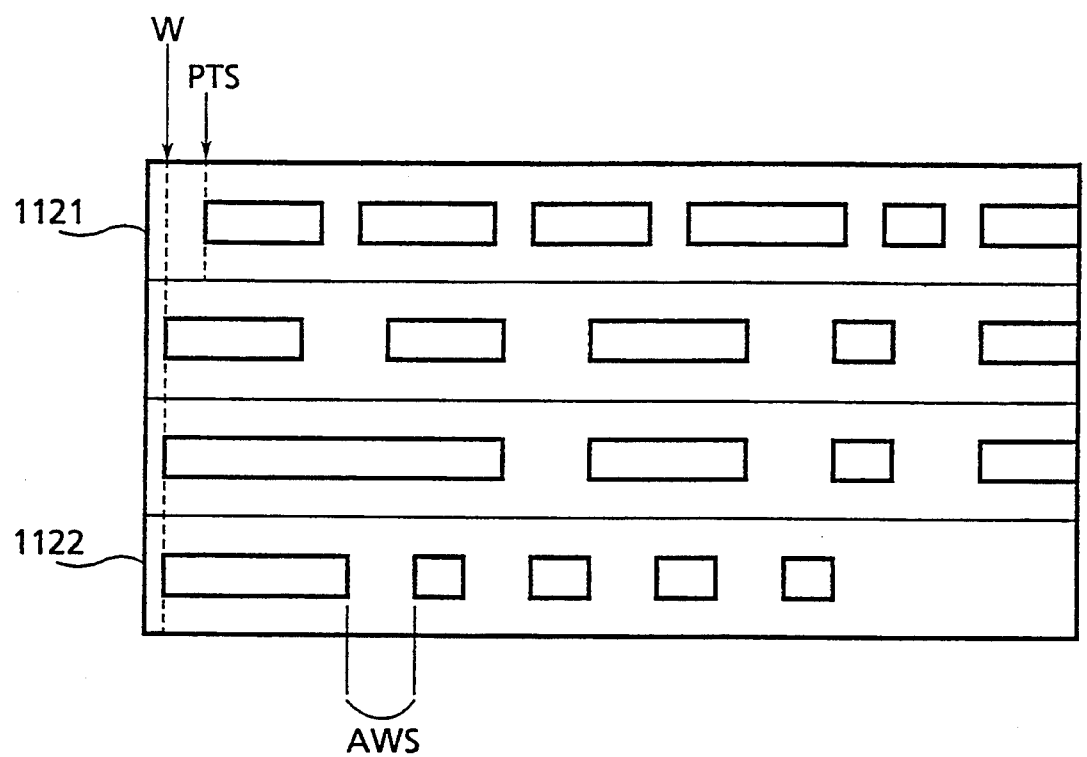
FIG. 9 shows an imaged output by the process of FIG. 8.
Figure 10:
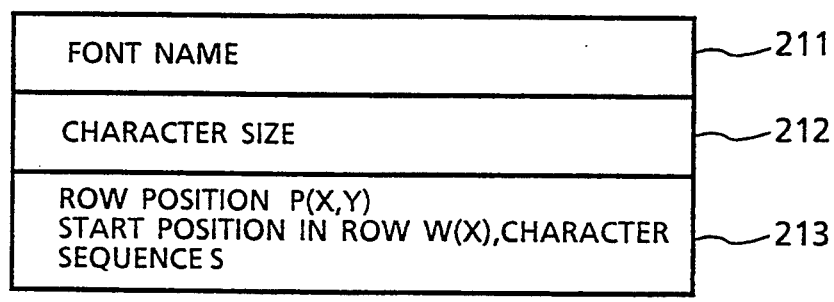
FIG. 10 shows text data represented by a basic specification of the ODA Standard.
Figure 11:
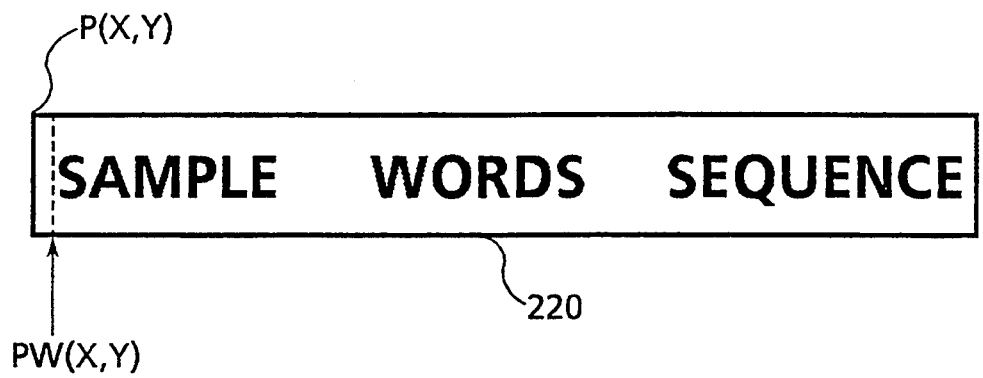
FIG. 11 shows an imaged output of the row represented by FIG. 10 by a prior art method for imaging the text.
Figure 12:
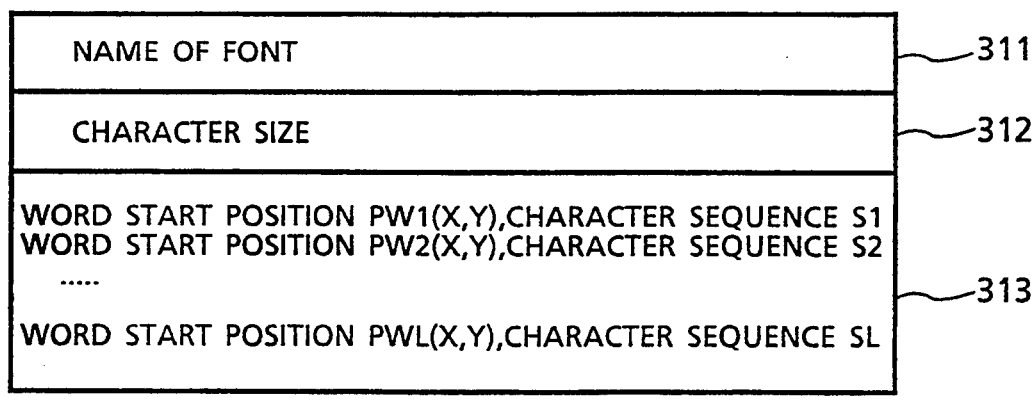
FIG. 12 shows text data represented by a basic specification of Post Script.
Figure 13:
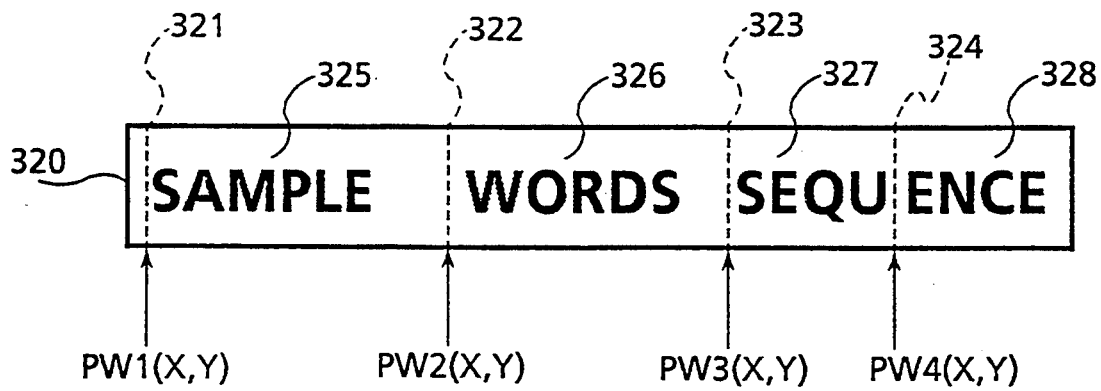
FIG. 13 shows an imaged output of the row represented by FIG. 12 by the prior art method for imaging the text.
Figure 14:
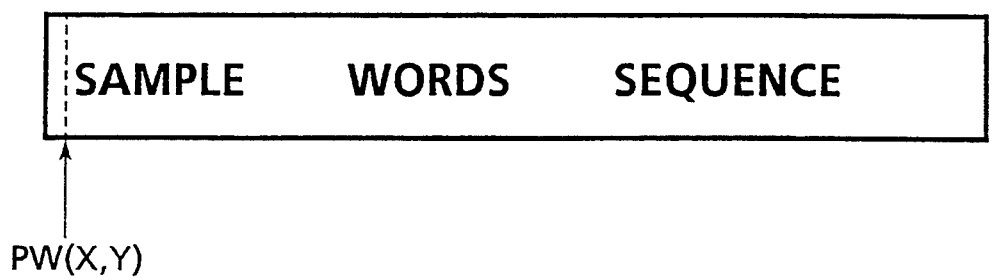
FIG. 14 shows an imaged output of the row represented by FIG. 10 by the prior art method for imaging the text with a different font.
Figure 15:
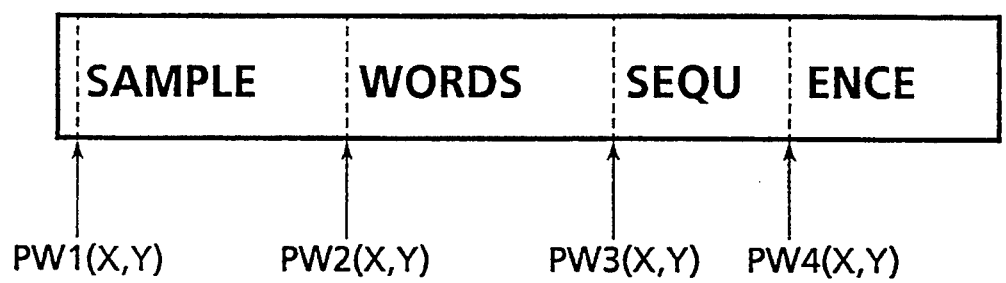
FIG. 15 shows an imaged output of the row represented by FIG. 12 by the prior art method for imaging the text with a different font.
Figure 16:
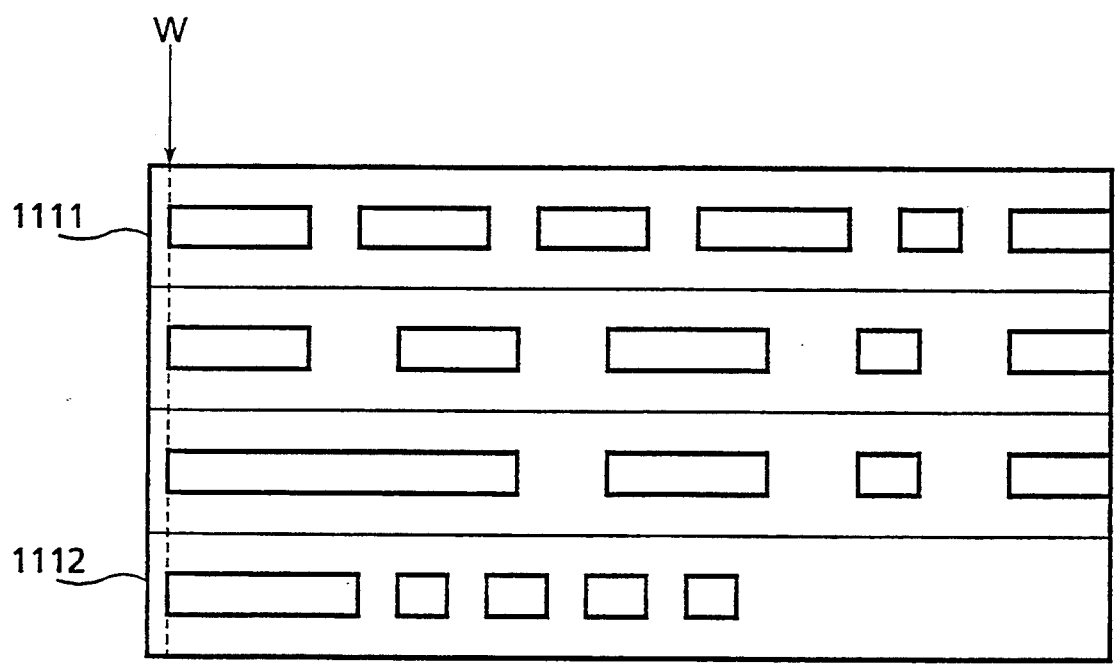
FIG. 16 shows an imaged output of a paragraph by the prior art method for imaging the text with a different font.

FIG. 9 shows an example of imaged paragraph.

"Left and right margins adjustment" is designated for the paragraph starting line 1121 but the starting word is arranged with a space of PTS from the left edge of the row area.

"Left offset" is designated for the paragraph ending row 1122 but the words are arranged with the average word interval AWS which is under than the normal word interval CW for "left offset".

In accordance with the above process for imaging the text, the problems of split or overlap of characters of one word or the blank at the right edge of the row area are solved, and any desired format may be designated. A space is reserved before the starting word of the starting line of the paragraph and the word intervals of the words of the ending row of the paragraph have a sufficient width.

In accordance with the method for imaging the text of the present invention, high quality and natural imaging is attained even if the text is imaged by using a different font than that designated at the layouting or by changing a character size.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A method for imaging a text, said method comprising the steps of:

designating text data including at least row area information for designating an area of each row of the text, the row area information including at least a row area width, character sequence information of words of the row and character size information for formatting, and imaging condition data including at least character size information for imaging;

calculating a row area width, a character sequence width and a total blank width for the imaging of a specified text, based on the designated row area information including at least row area width, character sequence information, character size information for formatting and character size information for imaging;

calculating a word interval by substantially evenly dividing the total blank width using the number of intervals of the character sequences as a divisor;

positioning a starting word at a left edge of the row area and positioning other words with said word interval therebetween to determine a character sequence position for imaging; and outputting the text in accordance with the determined character sequence position for imaging.

2. A method for imaging a text according to claim 1, wherein the character size for formatting and the character size for imaging are designated for at least one of each character or each row.

3. A method for imaging a text according to claim 1, wherein font information for formatting is included as the character size information for either of formatting or in addition to the character size information for formatting.

4. A method for imaging a text according to claim 1, wherein font information for imaging is included as the character size information for at least one of imaging or in addition to the character size information for imaging.

5. A method for imaging a text according to claim 1, wherein character enlargement factor information is included as the character size information for imaging.

6. A method for imaging a text according to claim 1, wherein the imaging condition data includes format designation for each row such as left and right margins adjustment, left offset, right offset or centering.

7. A method for imaging a text according to claim 6, wherein it is assumed that the left and right margins adjustment has been designated for a row for which the format designation has been omitted, when a starting character of the row is positioned at the left edge of the row area and an end character of the row is positioned at the right edge of the row area.

8. A method for imaging a text according to claim 1, wherein the text data includes paragraph starting row information and paragraph ending row information, a blank being reserved on the left of the starting word in the paragraph starting row, and the word interval in the paragraph ending row being close to an average word interval of the paragraph.

9. A method for imaging a text according to claim 8, wherein when format designation in the paragraph starting row includes adjustment of left and right margins, a blank of a predetermined width is reserved at the left edge of the row area and adjustment of the left and right margins is conducted in the remaining row area.

10. A method for imaging a text according to claim 8, wherein when format designation in the ending row of the paragraph includes left margin offset, the left margin offset is conducted by using an average word interval of the rows of the paragraph excluding the paragraph ending row as the word interval in the paragraph ending row.

11. A system for imaging a text, comprising:

means for designating text data including at least row area information for designating an area of each row of the text, said row area information including at least a row area width, character sequence information of words of the row and character size information for formatting, and imaging condition data including at least character size information for imaging;

means for calculating a row area width, a character sequence width and a total blank width for imaging of a specified text, based on the designated row area information including at least row area width, character sequence information, character size information for formatting and character size information for imaging;

means for calculating a word interval by substantially evenly dividing the total blank width using the number of intervals of the character sequences as a divisor, and positioning a starting word at a left edge of the row area and positioning other words with said word interval therebetween to determine a character sequence position for imaging; and means for outputting the text in accordance with the determined character sequence position for imaging.

12. A system for imaging a text according to claim 11, wherein said text data and said imaging condition data are stored in an external storage and read into a main memory.

13. A system for imaging a text according to claim 11, wherein the text data includes paragraph starting row information and paragraph ending row information, and said calculating means reserves a blank on the left of the starting word in the paragraph starting row and causes the word interval in the paragraph ending row to be close to an average word interval of the paragraph.

14. A method for imaging a text according to claim 1, wherein said text data further includes font designation, character size, row area left bottom position P(X,Y), row area height, row area width a starting positioning point of a starting character in the row area and a character sequence of words.

15. A system for imaging a text according to claim 11, wherein said text data further includes font designation, character size, row area left bottom position P(X,Y), row area height, row area width a starting positioning point of a starting character in the row area and a character sequence of words.

* * * * *